United States Patent Office 3,513,130
Patented May 19, 1970

3,513,130
REMOVING CATALYST FROM HYDRO-
FORMYLATED POLYMERS
Joseph K. Mertzweiller and Lawrence W. McLean, Baton
Rouge, La., assignors to Esso Research and Engineering
Company, a corporation of Delaware
No Drawing. Filed Nov. 9, 1965, Ser. No. 507,048
Int. Cl. C08g 17/10; C08f 3/70; C07c 69/60
U.S. Cl. 260—75
5 Claims

ABSTRACT OF THE DISCLOSURE

Cobalt or rhodium catalyst complexes employed in the preparation of hydroxylated homopolymers and copolymers of $C_4$–$C_6$ conjugated diolefins are removed from the hydroxylated homopolymers or copolymers by treatment thereof with a saturated or unsaturated polycarboxylic acid or anhydride (e.g. succinic, maleic, etc.), thereby converting the catalyst complexes to metal soaps. The metal soaps are then precipitated with a slight excess of an acid forming a salt with the cobalt or rhodium (e.g. oxalic acid).

This invention relates to a method for the removal of catalyst from the reaction product obtained by the hydroxylation of certain unsaturated hydrocarbon polymers and more particularly relates to the destruction and removal of the cobalt complex used as catalyst in such hydroxylation reactions.

It has previously been found that novel oxygenated hydrocarbon polymers, i.e. hydroxylated and/or carbonyl derivatives thereof can be prepared by reacting an olefinic polymer with carbon monoxide and hydrogen in the presence of a hydrocarbon soluble complex which contains a transition metal selected from Group VIII of the Periodic Table in complex bond with carbon monoxide and at least one biphyllic ligand containing an element of Group VA of the Periodic Table of the Elements, such as phosphorus.

The hydroxylation product thus obtained contains a large amount of the transition metal in solution which must be removed. This has conventionally been done by treating the reaction product with a relatively strong acid, e.g. a 10% solution of $H_3PO_4$ at temperatures of 120 to 175° C. An excess of the acid with respect to the metal is necessary and this excess has an adverse effect on the stability properties of the final product. Furthermore, the reaction is slow and time consuming. Often the hydroxylated polymers may undergo at least partial cross-linking in the presence of the strong acid residues.

In accordance with the present invention it has been found that the transition metal can be converted to an easily removable form by treating the reaction product prior to removal of the catalyst with a saturated or unsaturated polycarboxylic acid or acid anhydride which at the same time esterifies the hydroxyl groups on the polymer.

The hydroxylated polymers to which the present invention is applicable broadly comprise the hydroformylation products of unsaturated hydrocarbon polymers having molecular weights of from about 300 to 1,000,000 or more prepared by the polymerization of conjugated diolefins of 4 to 6 carbon atoms or the copolymerization of these diolefins with styrene or its homologs using alkali metal or alkali metal-hydrocarbon complexes as catalyst, e.g. sodium dispersions, sodium naphthalene, butyl lithium and the like or by free radical catalysis, e.g. peroxides. Especially suitable as starting polymers for the hydroxylation reaction are the commercial copolymers of butadiene-1,3 and styrene, having molecular weights of 2000 to 4000 and polybutadienes having molecular weights of 800 to 3000. Polymers and copolymers having molecular weights even as low as 300 to 500 may also be used.

The hydroxylation of these polymers is accomplished in a two-stage process in the first stage of which conditions are maintained to maximize oxonation and minimize hydrogenation and in the second stage the conditions are so maintained that hydrogenation is maximized.

The hydrocarbon soluble complexes used in both stages as catalysts in the preparation of the hydroformylated polymers are oxo-type catalysts and can be represented by the following formulae:

I                  $[M_2(CO)_6(ZR_3)_2]$

II                $[(R')M(CO)_y(ZR_3)]_x$ where in both formulas M is a transition metal and may be cobalt or rhodium, preferably cobalt; Z is a Group VA metal, either phosphorus or arsenic, preferably the former; R is a radical containing from 1 to about 20, preferably 1 to 6, carbon atoms and may be either alkyl or alkoxy; and in Formula II, R' represents a pi bonded conjugated diolefin or allylic structure containing 3 to 6 carbon atoms; $x$ is 1 or 2 and $y$ is 1 or 2 with the proviso that when $x$ is 1 then $y$ is 2 and vice versa.

The preferred forms of the complexes are represented by the following formulas:

III              $[Co_2(CO)_6(PR_3)_2]$

IV             $[C_nH_{2n-1})Co(CO)_y(PR_3)]_x$ where $n$ is an integer from 3 to 6 and R, $x$ and $y$ are as defined above.

The preparation of these complexes are described more fully in copending applications, Ser. No. 256,258, now U.S. Pat. 3,310,576, issued Mar. 21, 1967 and Ser. No. 256,260 abandoned Mar. 14, 1966 of Mertzweiller and Tenney, both filed Feb. 5, 1963, the subject matter of which are incorporated herein by reference.

The method for preparing the catalyst complex as described in said abandoned U.S. application S.N. 256,260 involves the mixing of a solution of a cobalt or rhodium carbonyl with a biphyllic ligand; suitable solvents for the cobalt or rhodium carbonyl include paraffinic, naphthenic, aromatic hydrocarbons or inert oxygenated solvents with paraffinic solvents being preferred. The biphyllic ligand may be a phosphine, phosphite, phosphonite, phosphinite, arsine, arsite or arsenite, with the phosphines and phosphites being especially preferred.

As disclosed in said S.N. 256,260, a small stoichiometric excess of the ligand based on the cobalt or rhodium metal is generally employed, although small quantities of ligand may be used if desired. Similarly, molar ratios of ligand to metal of 0.5:1 to 5:1, preferably 1:1, can be used with good results. The pressure and temperature which are employed during mixing are not especially critical and can vary within wide limits. Preferably, a temperature of 50 to 200° F. is used with temperatures of 80 to 120° F. being especially preferred. Although pressures which are higher than atmospheric can be employed at this stage, it is preferred to utilize atmospheric pressure. In general, even within the broad operating limits set forth above, a predominant quantity of initial complex or precursor is formed within one hour reaction time. During such reaction, there is a vigorous evolution of carbon monoxide accompanying the precipitation of the precursor.

The precursor complex is separated from the reaction mixture by conventional operations and is preferably washed with a hydrocarbon or inert oxygenated solvent before subjecting said complex to subsequent treatment and, if desired, may be dried at temperatures of from 50 to 100° F., preferably under vacuum.

The precursor complex is then slurried in a hydrocarbon or inert oxygenated solvent and subsequently heated to a temperature of from 200° to 500° F., preferably 300° to 400° F. A heating period of from 15 to 20 minutes will generally suffice to convert the precursor to the desired active complex form. The active complex is separated by vacuum distillation of the solvent or by other means. While the complex can be used in solution form, if desired, the complex may be recrystallized one or more times before use.

The first stage of the hydroxylation reaction is effected by intimately contacting the desired olefinic hydrocarbon polymer with carbon monoxide and hydrogen in the presence of the phosphine or arsine complex described above at pressures of from 300 to 2000 p.s.i.g. and preferably at pressures of from 500 to 1200 p.s.i.g. and at temperatures in the range of 135° C. to 220° C., preferably from 150° to 200° C. The reaction time is from ten minutes to five hours, preferably from 0.5 to two hours. The molar ratio of hydrogen to carbon monoxide may vary from 10:1 to 1:1, however, there is no advantage in using a ratio greater than 3:1. The catalyst concentration ranges from 0.05 to 0.5 wt. percent calculated as metal based on the weight of polymer with concentration of 0.1 to 0.3 preferred.

The second stage hydrogenation reaction may be carried out at pressures of from 100 to 3000 p.s.i.g. and preferably at pressures from 100 to 1500 p.s.i.g. in the presence of hydrogen and 10 to 200 p.s.i.g. partial pressure of carbon monoxide. The temperature may range from 160° to 230° C., preferably from 190° to 210° C. The reaction time is from 0.5 to six hours, preferably from one to two hours.

It is particularly desirable to avoid conversion of the metal complex to either the colloidal metal or to other complex forms of cobalt which are very difficult to remove. This is accomplished by retaining sufficient carbon monoxide partial pressure, for example about 100 to 200 p.s.i.g., to stabilize the system.

Preparation of the hydroxylated polymers is more fully set forth in application Ser. No. 307,359 filed Sept. 9, 1963 to Cull, Mertzweiller and Tenney now U.S. Pat. 3,383,426 issued May 14, 1968. This application is incorporated herein by reference in order to complete the disclosure.

At the conclusion of the hydroxylation reaction the metal complex is converted to an easily removable form by esterifying the reaction product with about 1 to 50 wt. percent, preferably about 10 to 40 wt. percent of a saturated or unsaturated polycarboxylic acid or acid anhydride containing 2 to 20 carbon atoms, preferably 4 to 10 carbon atoms, at temperatures of about 65° to 120° C., preferably 80° to 115° C. During the reaction the dissolved metal is changed from the highly stable form as the Group VA metal complex as described above to a more labile and still soluble form believed to be soaps of the resin acid groups while the acid or acid anhydride reacts with the pendant hydroxy groups on the polymer to form the half ester. The metal soap is then easily precipitated by adding a small stoichiometric excess (with respect to the Group VIII metal) of an acid that gives an insoluble metal salt, e.g. oxalic acid. The salt and any free acid is separated by filtration or centrifugation. The remaining solution of half esters is stripped free of solvent and the half ester used as such or converted to water soluble ammonium or amine salt as described in copending application of Mertzweiller and Segura, Ser. No. 466,075, filed June 22, 1965 and abandoned Oct. 13, 1967.

In said abandoned S.N. 466,075, the water soluble ammonium or amine salt is prepared by reacting the half ester with a stoichiometric (or a slight excess) quantity of ammonia or an amine at temperatures of about 50 to 150° F., and more usually from about 75 to 100° F. Suitable amines are those corresponding to the formula $NR_3$ in which R is hydrogen or a $C_1$–$C_{10}$, preferably $C_1$–$C_6$, straight chain alkyl, branched chain alkyl or cycloalkyl group.

The polycarboxylic acids and acid anhydrides suitable for use in the present invention include both saturated and unsaturated aliphatic and aromatic compounds.

Saturated acids and anhydrides include unsubstituted succinic and phthalic and the substituted chlorosuccinic, chlorendic, tetrapropenyl succinic and the like.

Unsaturated acids and their anhydrides include maleic, citraconic, itaconic, glutaconic and the like, as well as their substituted derivatives such as methyl maleic and chloromaleic and the like.

The following examples will better illustrate the nature of the present invention, without, however, limiting the invention thereto. Parts and percentages are by weight unless otherwise indicated.

EXAMPLE 1

A 40% solution of a low molecular weight polybutadiene (about 900 av. mol. wt.) was hydroxylated in a two stage process as described above in the presence of a catalyst consisting of $(Co)_2(CO)_6[P(C_4H_9)_3]_2$ in a concentration equivalent to about 0.1 wt. percent of cobalt in the mixture. The first reaction stage was carried out at 175° C. for one hundred minutes at a pressure of 1010 p.s.i.g. using synthesis gas of about 1.4/1 $H_2$/CO ratio, a continuous flow of gas being maintained through the reactor. The second (hydrogenation) stage was carried out at 196° C. for seventy minutes at a pressure of 1500 p.s.i.g. of hydrogen containing about 2–5% of carbon monoxide. The color of the product was intense red and the infra red spectrum showed strong hydroxyl functionality and a trace of carbonyl functionality.

The above resin solution contained about 1000 p.p.m. of cobalt in solution and was mixed with 35 wt. percent of maleic anhydride (based on resin solids) in a glass flask and heated to reflux and maintained there for forty-five minutes. After refluxing for about fifteen minutes the color had changed from an intense red to intense purple, indicating that the cobalt had been converted to a soap. The solution was cooled slightly and 1.5 wt. percent (based on total solution) of a 10% aqueous oxalic acid solution was added, and the mixture heated again to reflux for ten minutes. The color had now changed to light yellow and a considerable amount of a pink precipitate (cobalt oxalate) was present. After standing overnight, the precipitate was filtered off and the filtrate was analyzed and found to contain 23 p.p.m. of cobalt. The total oxygen content of the resin was 17.8 wt. percent. This corresponds to removal of better than 97% of the cobalt originally added as catalyst.

EXAMPLE 2

7.8 moles of butadiene was polymerized in a 50/50 mixture of toluene and tetrahydrofuran at 25 to 30° C. using 0.1 equivalents of sodium present as sodium naphthalene as the initiator. The reaction mixture was quenched with HCl, filtered, and stripped free of naphthalene and solvents. The resulting oily polymer had a molecular weight of 576, about 12 to 13 wt. percent of toluene having been incorporated in the polymer by a chain transfer mechanism.

A 40% solution of the above polymer was hydroxylated with the same catalyst and in the same manner as described in Example 1. The intense red solution showed strong hydroxyl functionality and essentially none of the original unsaturation types.

The hydroxylated resin solution, still containing the catalyst, was mixed with 35 wt. percent maleic anhydride (based on resin) and heated at reflux for forty-five minutes. It was cooled slightly and 1.5 wt. percent (on solution) of 10% aqueous oxalic acid was added and reflux continued for twenty minutes longer. The product was filtered the next day and stripped free of solvent under good vacuum. The viscous, pale yellow resin had an acid number of 137 and a cobalt content of 17 p.p.m.

EXAMPLE 3

The half ester resin of Example 2 (90.5 grams) was mixed with the stoichiometric quantity of triethyl amine until the mixture was completely clear and homogeneous. The amine salts thus prepared were completely miscible with water giving nearly colorless solutions. An aqueous solution of 38.7% resin had a viscosity of about 30 stokes while an aqueous solution of 33.2% resin had a viscosity of 5.2 stokes. These aqueous solutions were used to coat steel Q panels. Bake cures at 150 to 175° C. gave clear, hard films of excellent flexibility and impact resistance.

EXAMPLE 4

A hydroxylated polybutadiene, prepared as in Example 1 and containing the hydroformylation catalyst, was esterified by refluxing with 30 wt. percent maleic anhydride (based on resin). The deep purple colored solution of the half ester was treated with a slight stoichiometric excess of 10% $H_3PO_4$ (in acetone) along with 3 cc. of water. Reflux was continued for twenty minutes. The color of the solution remained purple and could not be removed by filtration, thus indicating that phosphoric acid is not effective in achieving the final removal of cobalt.

The above data clearly show that the esterification of the hydroxylated polymer in the presence of the catalyst results in the conversion of the catalyst to an easily removable form in a commercially feasible period of time.

The nature of the present invention having thus been fully set forth and specific examples of the same given, what is claimed as new, useful and unobvious and desired to be secured by Letters Patent is:

1. A process for removing complex catalyst residues from hydroxylated polymers which comprises:
    (a) reacting (1) an unsaturated hydrocarbon polymer of a $C_4$–$C_6$ conjugated diolefin or an unsaturated hydrocarbon copolymer of a $C_4$–$C_6$ conjugated diolefin with styrene or a homolog of styrene, said polymer or copolymer having a molecular weight of from about 300 to about 1,000,000, with (2) carbon monoxide and hydrogen in the presence of a hydrocarbon soluble complex catalyst having either of the following formulas:

(I) $\quad [M_2(CO)_6(ZR_3)_2]$ or (II) $\quad [(R')M(CO)_y(ZR_3)]_x$ where M is cobalt or rhodium, Z is phosphorus or arsenic, R is an alkyl or alkoxy radical containing 1 to 20 carbon atoms, R' is a pi-bonded conjugated diolefin containing from 3 to 6 carbon atoms, $x$ is an integer from 1 to 2 and $y$ is an integer from 1 to 2 with the proviso that when $x$ is 1 then $y$ is 2 and vice versa to form a hydroxylated polymer or copolymer;
    (b) reacting, prior to removal of said complexed catalyst, 100 parts by weight of the hydroxylated polymer or copolymer with 1–50 parts of a polycarboxylic saturated or unsaturated acid or anhydride thereof containing 2–20 carbon atoms at a temperature between 65 and 120° C., so as to (1) produce the corresponding half ester of said acid or acid anhydride with the pendant hydroxy groups on said polymer or copolymer and (2) convert said catalyst complex to a metal soap; and
    (c) thereafter precipitating said metal soap with a slightly stoichiometric excess of oxalic acid.

2. The process of claim 1 in which the polycarboxylic acid or anhydride is an unsaturated dicarboxylic anhydride.

3. The process of claim 1 in which the catalyst is $$[Co_2(CO)_6(PR_3)_2]$$

or $$[(C_nH_{2n-1})Co(CO)_y(PR_3)]_x$$

where R is an alkyl or alkoxy radical containing from 1 to 6 carbon atoms, $n$ is an integer of from 3 to 6, $x$ is an integer of from 1 to 2, and $y$ is an integer of from 1 to 2 with the proviso that when $x$ is 1 then $y$ is 2 and vice versa.

4. The process of claim 3 in which the acid or anhydride is maleic anhydride.

5. The process of claim 1 in which the polymer is polybutadiene having a molecular weight of 300 to 4000.

References Cited

UNITED STATES PATENTS

| | | | |
|---|---|---|---|
| 3,318,972 | 5/1967 | Mertzweiller et al. | 260—85.1 |
| 3,334,076 | 8/1967 | Mertzweiller et al. | 260—85.1 |

WILLIAM SHORT, Primary Examiner

L. P. QUAST, Assistant Examiner

U.S. Cl. X.R.

260—78.4, 78.5, 85.1, 485